US005573563A

United States Patent [19]

Odom et al.

[11] Patent Number: 5,573,563

[45] Date of Patent: Nov. 12, 1996

[54] MICRO-ROTARY SCREENER

[75] Inventors: Horace L. Odom, Richmond; Kenneth A. Odom, Midlothian, both of Va.

[73] Assignee: Product Engineered Systems, Inc., Richmond, Va.

[21] Appl. No.: 474,466

[22] Filed: Jun. 7, 1995

[51] Int. Cl.$^{6}$ .......... B01D 33/15; B01D 33/48

[52] U.S. Cl. .......... 55/301; 55/401; 55/429; 55/471; 55/487; 55/502

[58] Field of Search .......... 55/301, 317, 328, 55/395, 400, 401, 429, 467, 471, 487, 502

[56] References Cited

U.S. PATENT DOCUMENTS

| | | | |
|---|---|---|---|
| 837,205 | 11/1906 | Elam | 55/400 |
| 844,312 | 2/1907 | Bachman . | |
| 1,304,884 | 5/1919 | Kawai . | |
| 1,610,053 | 12/1926 | Holmes | 55/400 X |
| 1,693,754 | 12/1928 | Henry | 55/471 X |
| 1,762,028 | 6/1930 | Phelps | 55/400 X |
| 1,789,871 | 1/1931 | Knight | 55/317 |
| 1,975,335 | 10/1934 | Smith | 55/317 |
| 2,034,323 | 3/1936 | Bernard | 55/317 |
| 2,060,507 | 11/1936 | Knowlton | 55/400 X |
| 2,230,453 | 2/1941 | Fitch | 183/8 |
| 2,509,817 | 5/1950 | Foreman | 183/21 |
| 2,514,623 | 7/1950 | Brown | 55/487 X |
| 2,973,056 | 2/1961 | Sillers, Jr. | 55/317 X |
| 3,358,413 | 12/1967 | Kalika | 55/230 |
| 3,486,313 | 12/1969 | Thomas | 55/301 X |
| 3,582,051 | 6/1971 | Klein | 261/79 |
| 3,696,590 | 10/1972 | Richmond | 55/238 |
| 3,727,383 | 4/1973 | Neitzel | 55/400 X |
| 3,800,513 | 4/1974 | Lappin | 55/238 |
| 3,859,066 | 1/1975 | Trutzschler | 55/401 |
| 4,073,631 | 2/1978 | Brady et al. | 55/97 |
| 4,266,829 | 5/1981 | Divers | 55/400 X |
| 4,478,216 | 10/1984 | Dukowski | 128/240.21 |
| 4,594,082 | 6/1986 | Catherwood, Sr. | 55/316 |
| 4,654,059 | 3/1987 | Matyas | 55/429 X |
| 4,878,926 | 11/1989 | Goodrich | 55/294 |
| 4,999,036 | 3/1991 | Hwang et al. | 55/317 |
| 5,067,974 | 11/1991 | Chang | 55/223 |
| 5,094,676 | 3/1992 | Karbacher | 55/316 |
| 5,173,987 | 12/1992 | Buckingham | 15/301 |
| 5,373,615 | 12/1994 | Webb et al. | 29/163.8 |

FOREIGN PATENT DOCUMENTS

| | | | |
|---|---|---|---|
| 907544 | 8/1972 | Canada . | |
| 854742 | 11/1952 | Germany | 55/400 |
| 2013007 | 9/1971 | Germany . | |
| 42854 | 1/1908 | Switzerland . | |
| 68981 | 5/1914 | Switzerland | 55/317 |

*Primary Examiner*—Robert Spitzer
*Attorney, Agent, or Firm*—Millen, White, Zelano, & Branigan, P.C.

[57] ABSTRACT

A micro-rotary screener for removing airborne materials from an airstream includes a shell for defining a generally drum-shaped shell, the shell including a first passageway for receiving the airstream and a second passageway for discharging cleaned air. A multi-blade rotating air lock within the shell includes an odd number of rotor lock blades for defining an odd number of pockets into which the airstream is directed. A drive is provided for causing the multi-blade rotating lock to rotate. Seals are attached to the rotor lock blades for contacting inner portions of the shell and restricting airflow between the plurality of pockets. Screens are attached to the edges of the rotor lock blades, and rotate therewith, for filtering airborne materials and for releasing filtered materials during rotation of the multi-blade rotating air lock. A material-discharge bin is provided for receiving filtered materials after they have been released from the screens.

14 Claims, 3 Drawing Sheets

MICRO-ROTARY SCREENER

BACKGROUND OF THE INVENTION

1. Field of the Invention

The invention relates in general to filtration devices for separating airborne materials from an airstream, and in particular to a scrubber system for removing and discharging particulate matter by gravity and/or centrifugal force.

2. Related Art

Dry air scrubbers have been known for removing airborne materials from an airstream. Dry air scrubbers are typically placed in-line in a duct system, either upstream or downstream from an air mover. If the dry air scrubber is upstream from the air mover, a negative air flow is drawn through the scrubber and, conversely, if such scrubber is placed downstream from the air mover, a positive air flow is forced through the scrubber. Alternatively, dry air filtration devices have been made integral with air movers.

Dry air scrubbers have been used in commercial facilities, such as hotels and larger buildings, where significant amounts of air require filtration. Dry air scrubbers have also seen use in industries where plant operations yield high levels of gaseous and/or particulate contaminants. Such industries include, e.g., the tobacco processing industry, chemical plants, and bakeries. In such industries, dry air scrubbers may be used in combination with wet air scrubbers to provide a complete filtration system.

However, air scrubbers of the prior art typically cause an undesireable static air-pressure drop of five to ten inches of water at their discharge. Such a static air-pressure drop results in reduced efficiency of the air mover and of the air filtration system as a whole, and places undesireable strain on the air mover. Air scrubbers of the prior art have also suffered from such drawbacks as inadequate removal of airborne particles, difficult cleaning, and inefficiency.

OBJECTS AND SUMMARY

It is therefore an object of the invention to provide an improved air scrubber for removal of airborne material from an air stream.

It is a further object of the invention to provide an air scrubber which operates with a reduced static air-pressure drop.

It is a further object of the invention to provide a scrubber with improved capabilities for filtering airborne materials.

The invention includes a micro-rotary screener for removing airborne materials from an airstream. A shell means is provided for defining a generally drum-shaped shell, the shell means including a first passageway for receiving the airstream and a second passageway for discharging cleaned air. A multi-blade rotating air lock means within the shell means includes an odd number of rotor lock blades for defining an odd number of pockets into which the airstream is directed. A drive means is provided for causing the multi-blade rotating lock means to rotate. Seals are attached to the rotor lock blades for contacting inner portions of the shell means and restricting airflow between the plurality of pockets. Screens are attached to the edges of the rotor lock blades, and rotate therewith, for filtering airborne materials and for releasing filtered materials during rotation of the multi-blade rotating air lock means. A material-discharge bin is provided for receiving filtered materials after they have been released from the screens.

BRIEF DESCRIPTION OF THE DRAWINGS

The foregoing and other objects, features, and advantages of the invention will be apparent from the following more-particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
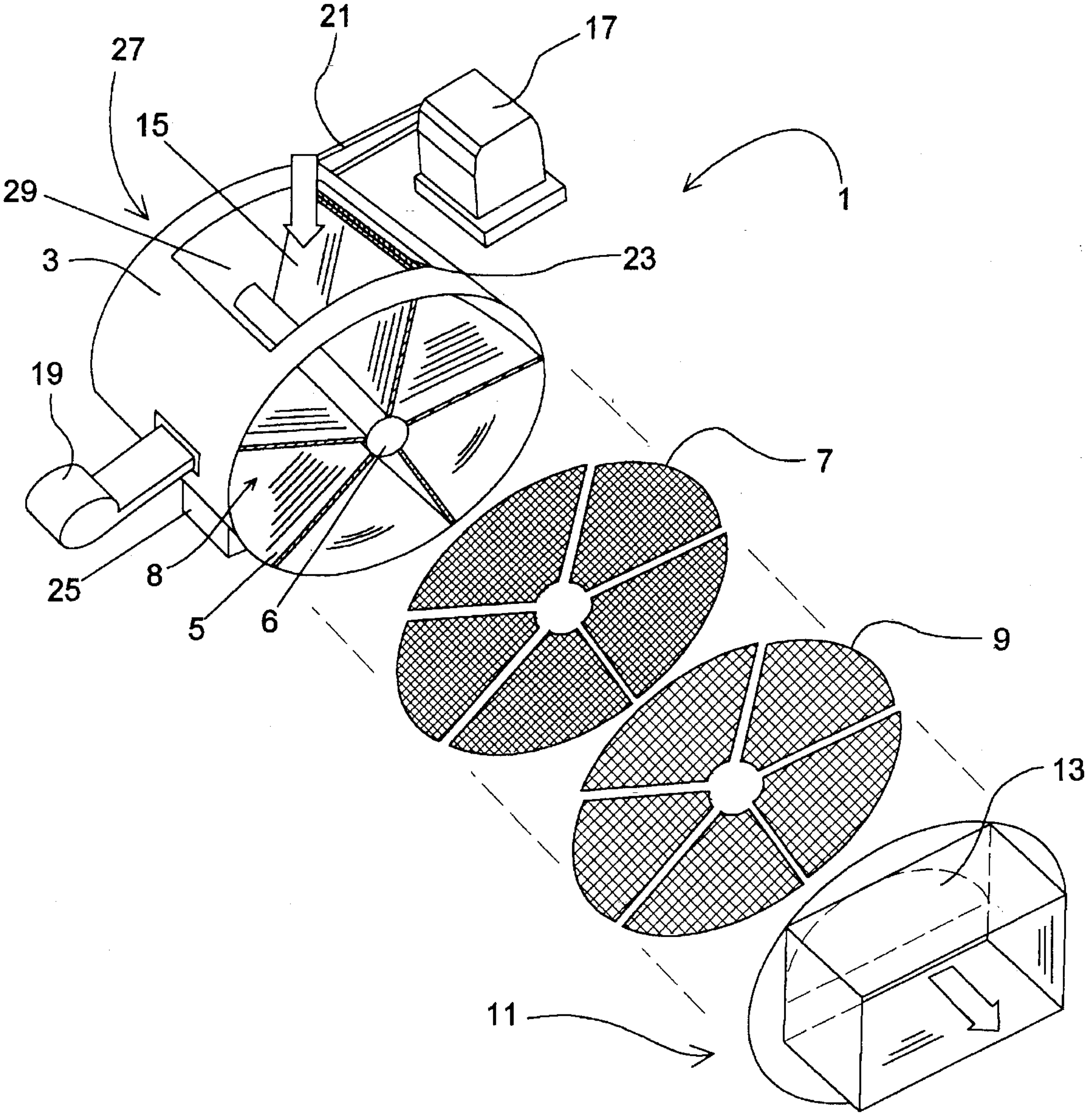
FIG. 1 illustrates a schematic perspective view of the invention according to a preferred embodiment.

With reference to FIG. 1, a micro-rotary screener 1 of the invention includes a drum-shaped outer shell 3 having an air intake 29 at a top portion thereof for receiving air containing airborne materials. An air discharge 11 is affixed at its rear-facing side to the drum-shaped outer shell 3 and is preferably connected at its front-facing side to a downstream air mover, which draws a negative airflow through the device. Cleaned air passes through the air discharge 11 via an opening 13, which preferably takes the shape of a semicircle and is located above the longitudinal axis of the drum-shaped outer shell 3. It should be noted that the terms "air" and "airstream" as used herein may include any flow of gas from which airborne material is to be removed.

Within the drum-shaped outer shell 3 is provided a multi-blade rotating air lock/screener comprising a plurality of rotor lock blades 5, 15 radially mounted around a shaft 6 to form a series of wedge-shaped pockets 8, the number of wedge-shaped pockets being equal to the number of rotor lock blades.

First and second screen sections 7, 9 are mounted on the edges of the rotor lock blades 5 so that two screen section cover each of the pockets. The first screen sections 7 are preferably constructed of fine mesh, e.g., 100×100 mesh×0.003 wire diameter×0.007 opening type 304 stainless steel wire cloth. The second screen sections 9, which are mounted on top of the first screen sections 7, are of a sturdier, broader mesh, and provide support for the finer first screen sections 7. The second screen sections 9 preferaby comprise 2×2 mesh type 304 stainless steel wire cloth. It should be noted that, alternatively, single circular screens could be used in place of the screen sections 7, 9, without departing from the spirit and scope of the invention.

The multi-blade rotating air lock/screener is driven by a motor 17 via a drive chain 21 which engages the motor 17 at a first portion and engages a sprocket on the shaft 6 at a second portion. The motor 17 may comprise, e.g., the Eurodrive gearmotor TEFC 3 phase 60 hz 230/460 VAC. The drive chain 21 may comprise, e.g., a #50 hardened pin roller chain. The drive chain 21 may be covered with a drive guard constructed of, e.g., 14 ga. cold-rolled steel. The shaft 6 is preferably of type 304 stainless steel and includes a shaft support cylinder with a nominal 6" diameter, stainless steel welds on the hubs, and Dodge Taperlock shaft locking assemblies. The multi-blade rotating air lock/screener preferably rotates on bearings, such as Dodge SC pillow block bearings lubricated with high-temperature grease and supported by bearing supports constructed of 2½"×2½"×¼" stainless steel angle with jack screws for bearing adjustment.

A rectangular material discharge bin 25 is sealed to the underside of the drum-shaped outer shell 3 for receiving particles as they drop out through an opening in the bottom of the outer shell. The material discharge bin is preferably removable for purposes of emptying the contents thereof.

Around each of the edges of the rotor lock blades 5 is a seal 23 or 31 (FIG. 2), which is preferably of a flexible multi-ply material which can withstand high temperatures. For example, tobacco belt comprising 3 or 4 plies of polyethylene cloth bonded together by butyl rubber can be used. A back 27 encloses the rear of the outer shell 3 and is preferably constructed of 11 ga. type 304 stainless steel. The seals 23, 31, engage the sides of the outer shell 3, the back 27, and the air discharge 11, thereby sealing the pockets 8 during portions of their rotation.

The drum-shaped outer shell 3 is preferably constructed of 11 ga. type 304 stainless steel and may have structural members of similar stainless steel or other material suitable to withstand operating pressures and temperatures. The micro-rotary screener of the invention may be supported by 2½" square stainless steel tubing capped to prevent dust build up and potential contamination. Transitions and elbows may be provided where necessary, and are constructed of, e.g., 14 ga. type 304 stainless steel reinforced with 2"×2"×¼" type 304 stainless steel angle flanges.

Figure 2:
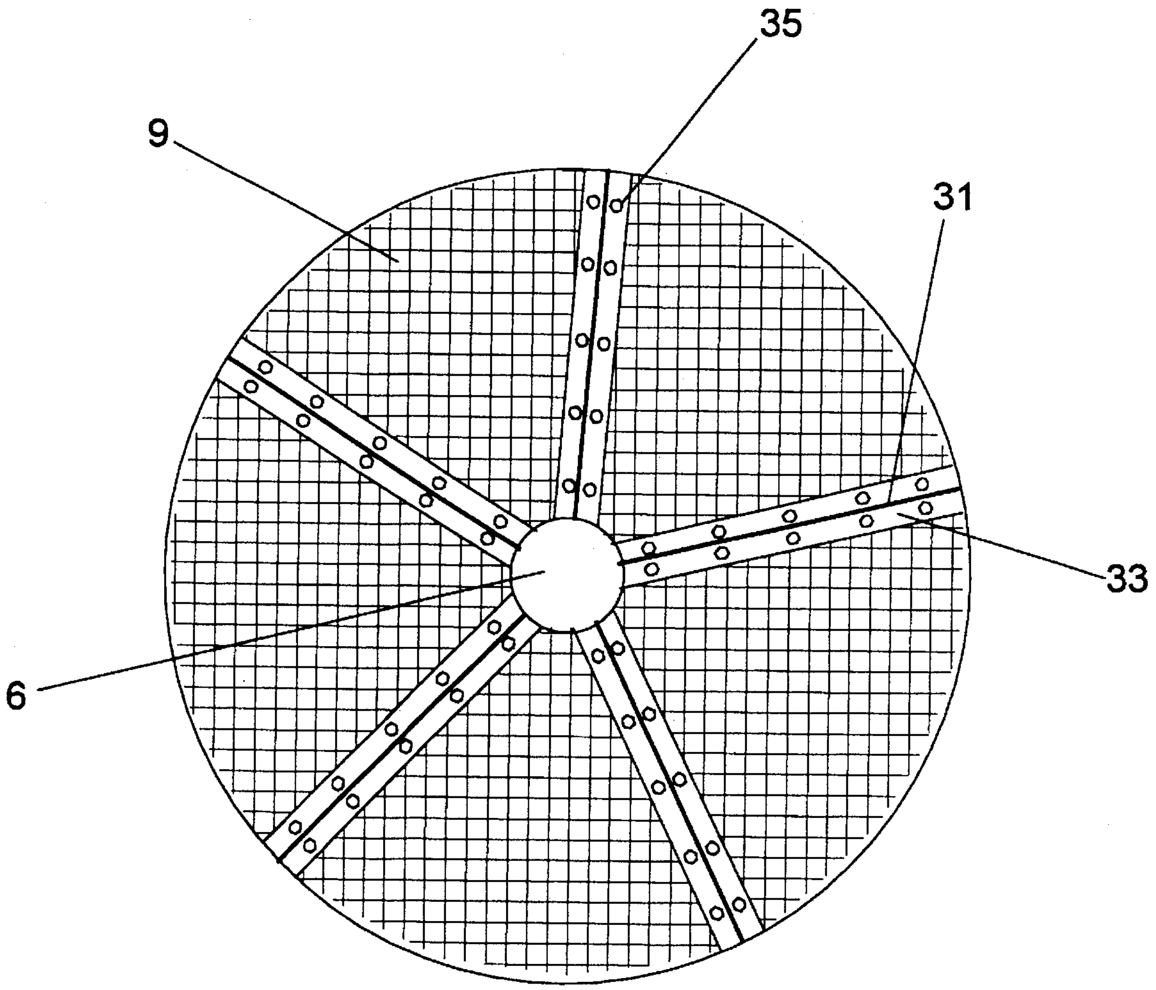
FIG. 2 illustrates a front view of screen sections and seals according to the invention.

With reference to FIG. 2., screen sections 9 are mounted to the side-facing edges of the rotor lock blades 5 (FIG. 1 ) via angle flanges 33 bolted to the blade edges by bolts 35. Beneath each screen section 9 is a screen section 7 (FIG. 1). On each blade edge is fastened two opposing angle flanges 33, which, in addition to securing the screen sections, also serve to secure a seal 31 to the blade edge.

With reference again to FIG. 1, in operation, air containing airborne materials is drawn, preferably via negative airflow provided by a downstream air mover, into the device at the air intake 29 and falls into one of the rotating wedge-shaped pockets 8. A portion of the air is immediately pulled through the screen sections 7, 9, which catch the airborne materials, and the cleaned air continues through the air discharge 11 via opening 13. As the particular wedge-shaped pocket into which the air has fallen continues to rotate around past the air intake 29, that pocket becomes sealed by virtue of the seals 23. The rotation continues to the bottom half of the unit, where ambient pressure resides, allowing material to drop, by gravity and centrifugal force, off the screens 7 into the material discharge 25.

It is important that the multi-blade rotating air lock/screener comprise an odd number of rotor lock blades 5, and thereby an odd number of pockets 8. If an even number of compartments is used, the upper portion of the drum-shaped outer shell 3 is isolated from its lower portion at certain times during rotation by virtue of the seals 23, 31. This isolation causes an undesireable pulsation in the air flow and a resulting disruption in the removal of particles. With an odd number of pockets, such as five, the air which is drawn into the intake 29 will at all times be able to flow from three out of the five pockets. By providing a greater number of unsealed pockets than sealed pockets at any given time, the micro-rotary screener of the invention avoids the undesirable pulsation effect.

The micro-rotary screener of the invention may operate with, e.g., a static air pressure drop at its air discharge 11 of only 1 to 1½ inches of water.

A screen blow-back system 19 may be provided for blowing an air knife into the drum-shaped outer shell 3 to clean the screens as they rotate during a cleaning cycle. The screen blow back system 19 may comprise, e.g., a pressure blower with a 1 HP 3-phase 60 hz 230/460 VAC motor, a fan-intake filter box with replaceable filter, a connection hose of 4" aluminum flex duct, and an air knife guide of 14 ga. type 304 stainless steel. A screen steam-cleaning system may also be provided, and may comprise a means for providing high-pressure steam, type 304 stainless steel piping, and Spraying Systems Co. type 316 stainless steel spray nozzles directed toward the screens.

Figure 3:
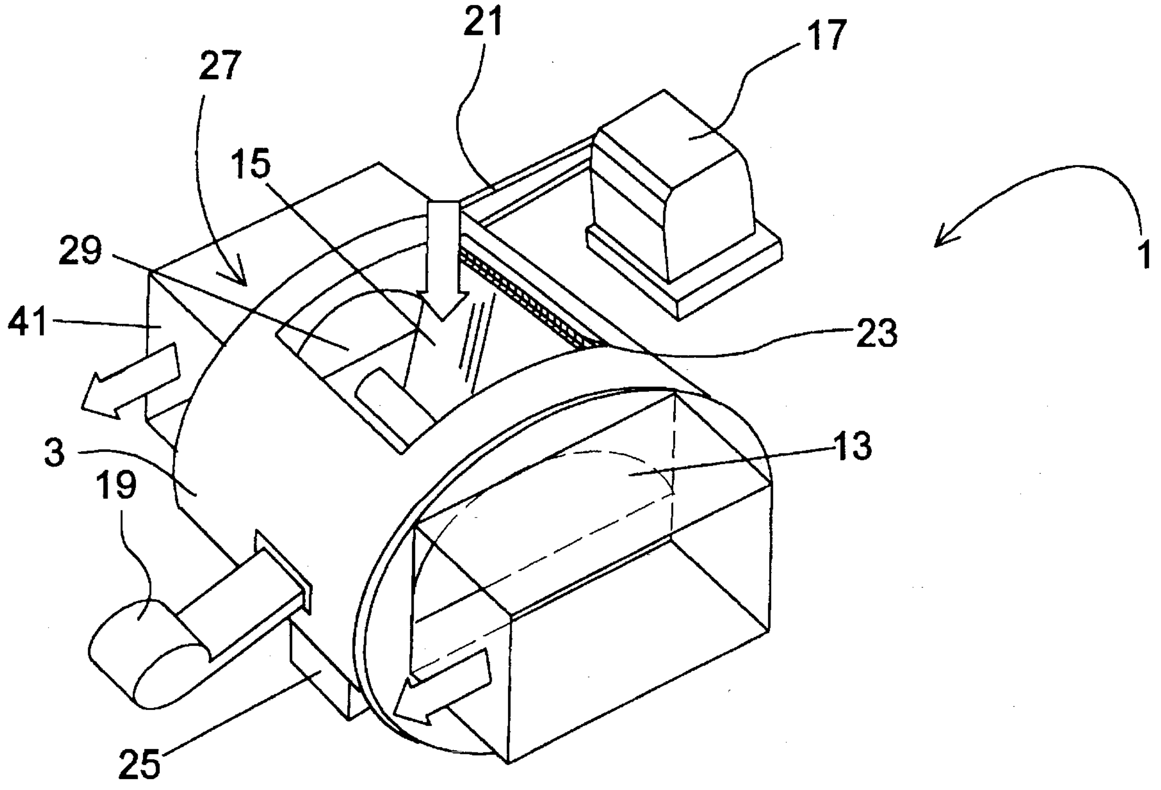
FIG. 3 illustrates a schematic perspective view of the invention according to a second embodiment.

FIG. 3 illustrates a second embodiment of the invention in which air is pulled through screens on two sides of the screener. A second air discharge 41 is provided on the far side of the drum-shaped outer shell 3. The second air discharge 41 is constructed in a similar manner as the first air discharge, and is also provided with an opening in the form of a semicircle. In this embodiment, the screens, as illustrated in FIG. 2, are mounted on both the near and far side edges of the rotor blades. This embodiment provides an even smaller static pressure drop, resulting in further diminished strain on the air mover.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A filtration device for removing airborne materials from an airstream, comprising:

shell means for defining a generally drum-shaped shell, said shell means comprising a first passageway for receiving said airstream and a second passageway for discharging cleaned air;

multi-blade rotating air lock means within said shell means, said multi-blade rotating air lock means comprising an odd number of radially-oriented rotor lock blades for defining an odd number of pockets into which said airstream is directed;

drive means for causing said multi-blade rotating air lock means to rotate;

seal means for contacting said rotor lock blades and inner portions of said shell means, whereby airflow is restricted between said odd number of pockets;

filtration means operably connected to said rotor lock blades, and rotating therewith, for filtering said airborne materials and for releasing filtered materials during rotation of said multi-blade rotating air lock means; and, means for receiving said filtered materials after said filtered materials have been released from said filtration means.

2. The filtration device according to claim 1, wherein said first and second passageways are located above the longitudinal axis of said shell means.

3. The filtration device according to claim 2, wherein said means for receiving is located below the longitudinal axis of said shell means.

4. The filtration device according to claim 1, wherein said filtration means comprises at least one screen section.

5. The filtration device according to claim 4, wherein said at least one screen section comprises a first screen having a fine mesh and a second screen having a broad mesh.

6. The filtration device according to claim 1, wherein said second passageway comprises a semicircular opening.

7. The filtration device according to claim 1, wherein said filtration means comprises at least one screen section attached edge portions of at least two of said odd number of rotor lock blades.

8. The filtration device according to claim 1, wherein said means for receiving said filtered materials comprises a material discharge bin removably sealed to a bottom portion of said shell means.

9. The filtration device according to claim 1, wherein said shell means further comprise a third passageway, for discharging said cleaned air.

10. A filtration device for removing airborne materials from an airstream, comprising:

shell means for defining a generally drum-shaped shell, said shell means comprising a first passageway for receiving said airstream and a second passageway for discharging cleaned air, said first and second passageways being located on the upper half of said shell means;

an odd number of radially-oriented rotatable rotor blades for defining an odd number of pockets into which said airstream is directed, each of said pockets being sealed from communication with said passageways during a first portion of its rotation and being in communication with either of said passageways during a second portion of their rotation, said rotor blades being equidistantly positioned such that, at any given point in their rotation, the number of said pockets which are in communication with said passageways is greater than the number of said pockets which are sealed from communication with said passageways;

drive means for causing said rotor blades to rotate;

screen means connected to edge portions of said rotor blades, and rotating therewith, for filtering said airborne materials and for releasing filtered materials during rotation of said rotor blades; and, means for receiving said filtered materials after said filtered materials have been released from said screen means.

11. The filtration device according to claim 10, wherein said first and second passageways are located above the center of said shell means.

12. The filtration device according to claim 11, wherein said means for receiving is located below the center of said shell means.

13. The filtration device according to claim 10, wherein said second passageway comprises a semicircular opening.

14. A filtration device for removing airborne materials from an airstream, comprising:

shell means for defining a generally drum-shaped shell, said shell means comprising a first passageway for receiving said airstream and second and third, semicircular passageways for discharging cleaned air, said first and second passageways being located above the longitudinal axis of said shell means;

multi-blade rotating air lock means within said shell means, said multi-blade rotating air lock means comprising an odd number of radially-oriented rotatable rotor blades for defining a plurality of pockets into which said airstream is directed, each of said pockets being sealed from communication with said passageways during a first portion of its rotation and being in communication with either of said passageways during a second portion of their rotation, said rotor blades being equidistantly positioned such that, at any given point in their rotation, the upper half of said shell means is not isolated from the lower half of said shell means;

drive means for causing said multi-blade rotating lock means to rotate;

seal means for contacting said rotor lock blades and inner portions of said shell means, whereby airflow is restricted between said plurality of pockets;

first and second screen sections attached to edge portions of said rotor lock blades, said first screen section having a fine mesh and said second screen section having a broader mesh, for filtering said airborne materials and for releasing filtered materials by centrifugal force and gravity during rotation of said multi-blade rotating air lock means; and, a material discharge bin for receiving said filtered materials after said filtered materials have been released from said first and second screen sections, said material discharge bin being removably sealed to a bottom portion of said shell means.

* * * * *